Feb. 27, 1945.  W. L. REED  2,370,581
LUBRICATING SYSTEM FOR AIRCRAFT SUPERCHARGERS
Filed Dec. 22, 1941
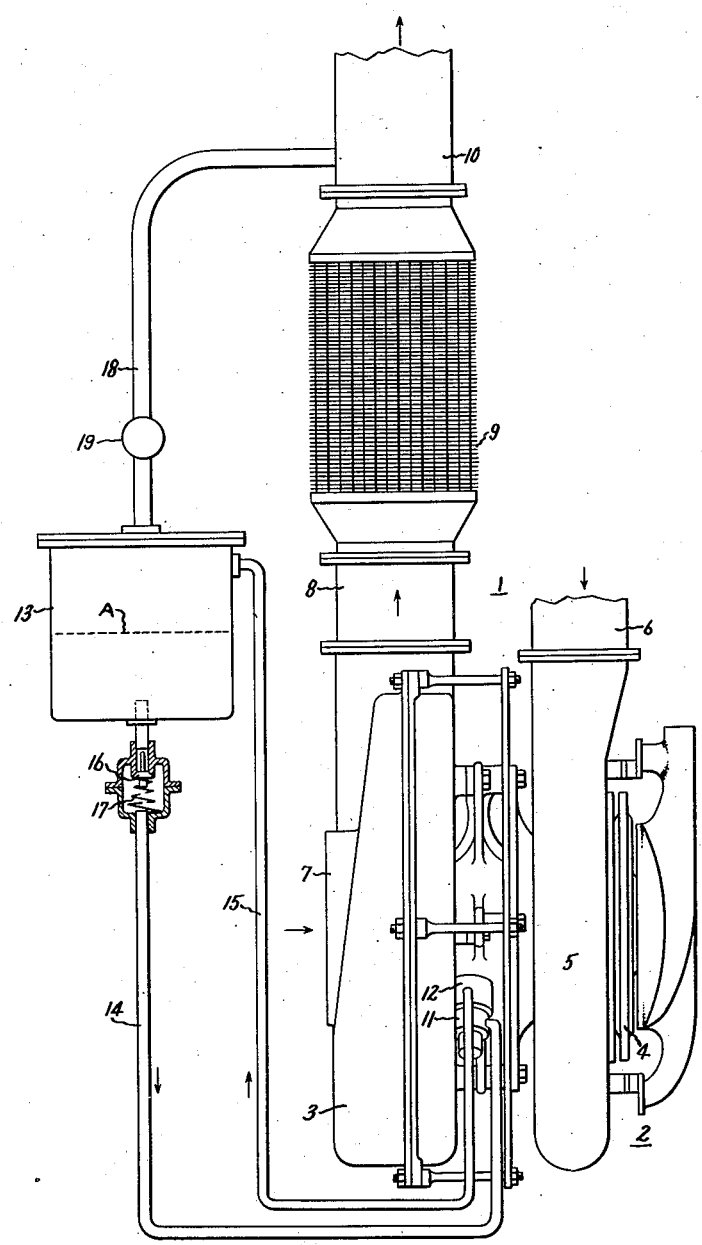
Inventor:
William L. Reed,
by Harry E. Dunham
His Attorney.

Patented Feb. 27, 1945

2,370,581

UNITED STATES PATENT OFFICE 2,370,581

LUBRICATING SYSTEM FOR AIRCRAFT SUPERCHARGERS

William L. Reed, Lynn, Mass., assignor to General Electric Company, a corporation of New York Application December 22, 1941, Serial No. 423,867

2 Claims. (Cl. 184—6)

In connection with aircraft having superchargers driven either from the aircraft engine shaft or by exhaust gases from the aircraft engine or engines, it is customary to lubricate the supercharger with oil taken from a supply tank. This oil supply tank ordinarily is at a level on the aircraft above that of the supercharger and a supply pipe leads from the oil tank down to the supercharger pressure lubricant pump, usually a rotary pump driven through suitable gearing from the supercharger shaft, from which the oil flows to the parts to be lubricated, then to a sump in the supercharger casing. From the sump, the oil is returned by a scavenger pump to the oil tank. The oil tank may be for supplying oil for the supercharger only or it may be the same oil tank as is used to supply the engine or engines of the aircraft.

The object of my invention is to provide an improved construction and arrangement of lubricating system, and for a consideration of what I believe to be novel and my invention, attention is directed to the following specification and the claims appended thereto.

In the drawing, the figure is a diagrammatic view of a system embodying my invention.

Referring to the drawing, 1 indicates an aircraft supercharger, in the present instance a gas driven supercharger comprising a gas turbine 2 and a centrifugal compressor 3. The turbine wheel of the gas turbine is indicated at 4 and the nozzle box which supplies exhaust gas to the turbine wheel is indicated at 5. Exhaust gases from the aircraft engine are supplied to the nozzle box through conduit 6. The compressor inlet is indicated at 7 and the compressor outlet at 8. From outlet 8, compressed air is led through a cooler 9 and conduit 10 to the points of consumption for the air, for example an aircraft engine, the aircraft cabin, or both. 11 indicates the pressure lubricant pump and 12 indicates the scavenger pump. The lubricating oil tank is indicated at 13, the dotted line A indicating the level of oil in the tank. As stated, it may be an oil supply tank for the supercharger alone or it may be the oil tank which supplies oil to the aircraft engine or engines, and as shown it is at a level above that of the supercharger. The oil tank is connected to the inlet of the pressure lubricant pump 11 by a pipe line or conduit 14. The outlet of the scavenger pump 12 is connected to the oil tank by a pipe line or conduit 15. The conduits leading from pressure lubricant pump 11 to the bearings of the supercharger and from the sump to the inlet of the scavenger pump are not shown in the drawing, this being not needed for an understanding of my invention.

With such an arrangement, the pressure lubricant pump when running takes oil from tank 13 through conduit 14 and discharges it to the parts to be lubricated. The flow of oil through the pressure lubricant pump 11 depends upon the absolute pressure of the inlet to the pump and this in turn depends upon a number of factors among which are the head of oil, and the pressure on the surface of the oil in tank 13. This latter is a factor of considerable value and affects materially the operation of the pressure lubricant pump so that for aircraft intended to operate at high altitudes, altitudes of the order of 30,000 feet, for example, it has been necessary in order to insure an adequate supply of oil at such high altitudes to use relatively large pressure lubricant pumps, considerably larger than would be needed for lower altitudes only, for example altitudes of the order of 8,000 feet.

According to one feature of my invention, I overcome the difficulty due to change of pressure on the oil at high altitudes by connecting the oil tank above the level of the oil therein by pipe line or conduit 18 to the discharge side of the supercharger so that the oil is subjected to the pressure on the discharge side of the supercharger. This may be a pressure corresponding to an altitude pressure of the order of 8,000 feet, for example. In other words, I supercharge the oil tank. By thus supercharging the oil tank, I maintain therein a pressure on the oil which serves to assist in effecting the flow of oil through conduit 14 to the suction side of the pressure lubricant pump. As a result, I may utilize a pressure lubricant pump of a size not larger than that required at an altitude at which the pressure corresponds to the pressure on the discharge side of the supercharger. The conduit 18 includes a non-return valve 19 to prevent the flow of oil from the tank 13 through the conduit 18 in certain positions of the aircraft.

According to a further feature of my invention, I provide in conduit 14 which leads from oil tank 13 to the supercharger pressure lubricant pump 11 an outwardly opening check valve 16 biased toward closed position by a spring 17. Check valve 16 is subjected on its lower side to the pressure obtaining in conduit 14 and the pressure of spring 17 and on its upper side to the head of oil in tank 13 and to the pressure obtaining above the oil level, i. e., supercharger pressure.

The strength of spring 17 is so correlated to the pressure opposed to it that under normal operating conditions with the pressure lubricant pump 11 running, valve 16 will be opened by the suction of the pump and oil fed to the system, but when the pump 11 is not running or for any reason suction in conduit 14 is lost (for example, by breaking of the conduit) valve 16 will close and remain closed, thus preventing leakage of oil from the tank through conduit 14.

I have found that a check valve alone in the oil pump suction conduit 14, the connection 18 being omitted, is not satisfactory for if spring 17 is made strong enough to hold valve 16 closed at lower altitudes and when pump 11 is not running, the oil in tank 13 being subjected to the surrounding altitude pressure, then at higher altitudes the suction of pump 11 may not be sufficient to effect opening of the valve 16 against the action of the spring; while, if the spring is made light enough to insure the opening of check valve 16 by the suction of pump 11 at higher altitudes, then at lower altitudes the valve might fail to close should pipe 14 be broken or for any other reason suction is lost in pipe 14, for example by the shutting down of the supercharger and pressure lubricant pump. Should pipe 14 be broken, for example, with the airplane at high altitude and check valve 16 failed to close, all the oil from tank 13 might be lost, a thing which would be especially disastrous in case tank 13 serves not only as a lubricant supply for the supercharger but also as a lubricant supply for the engine or engines of the aircraft.

The arrangement makes sure that the oil cannot leak from tank when the supercharger is not running.

By my invention, I provide a system which adds materially to the safety and reliability of the aircraft supercharger and the aircraft engine itself.

In accordance with the provisions of the patent statutes, I have described the principle of operation of my invention together with apparatus which I now consider to be the best embodiment thereof; it is to be understood, however, that the arrangement shown is only by way of illustration and that the invention may be carried out by other means.

What I claim as new and desire to secure by Letters Patent of the United States is:

1. In a lubricating system for an aircraft, the combination of a supercharger on the aircraft, parts to be lubricated, a lubricant supply tank located at a level higher than that of said parts, a pressure lubricant pump for supplying lubricant to said parts, a conduit which connects the suction side of said pump to said tank, a check valve in said conduit biased to closed position, and a conduit connecting the lubricant supply tank above the lubricant therein to supercharger air pressure, the biasing force acting to hold the check valve closed being so correlated to the pressure obtaining above the lubricant in the tank that for normal operating conditions the check valve will be opened by the pump suction when the pump is running.

2. In a lubricating system for an aircraft, the combination of a supercharger on the aircraft having parts to be lubricated, a lubricant supply tank located above the level of the supercharger, a pressure lubricant pump driven by the supercharger for supplying lubricant to said parts, a conduit connecting the suction side of the pump to said tank, a spring pressed check valve in said conduit, and a conduit connecting the tank above the level of the lubricant therein to supercharger air pressure, the biasing force tending to hold said check valve closed being so correlated to the pressure obtaining above the lubricant in the tank that for normal operating conditions the check valve will be opened by the pump suction when the pump is running.

WILLIAM L. REED.